8179X
J. Burrington,
Harness Tool.
Patented May 1, 1834.
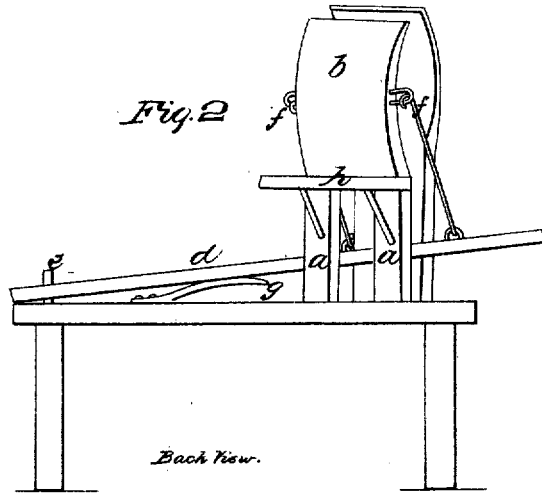
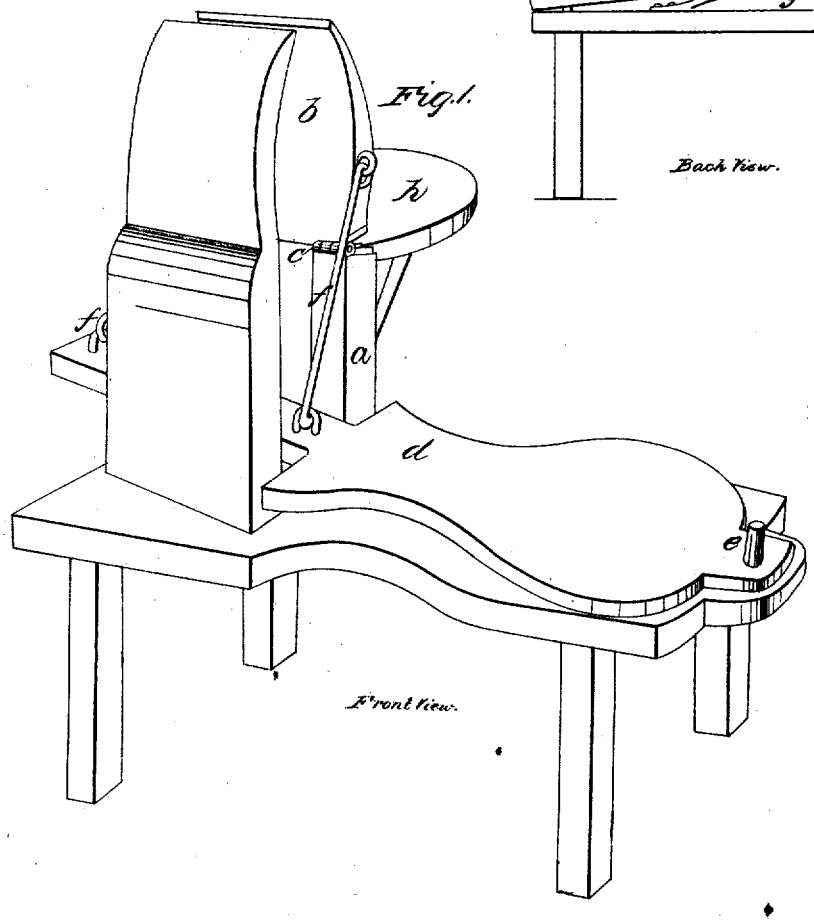
N. PETERS, PHOTO-LITHOGRAPHER, WASHINGTON, D. C.

May 1, 1834 8179X 10.

Joseph Burrington of Burke, county of Caledonia State of Vermont.

Letters Patent.

The Schedule referred to in these Letters Patent and making part of the same containing a description in the words of the said Joseph Burrington himself of his improvement in the manner of constructing the clamp used in the sewing and stitching of leather for Harness &c.

To all whom it may concern. Be it Known, that I Joseph Burrington of Burke in the county of Caledonia & State of Vermont have invented an improvement in the manner of constructing the clamp used in the sewing and stitching of leather for making harness & for other purposes, and I do hereby declare that the following is a full and exact description thereof. I make a trestle or horse of a little less in height than that ordinarily empl[illegible] a seat when working at such a machine; the actual seat being upon the widened of a lever to be presently described; which serves also to close and open the jaws of the clamp.

At or near the middle of the top of the trestle I affix two upright standards, on the upper end of which I attach by hinges or rule joints the jaws of the clamp. The lever to which I have already alluded extends along the trestle from end to end working upon a pin or fulcrum, at that end which is furthest from the seat and having two rods extending up from the middle of it which are fastened to staples on the under or inner side of the jaws, when the end which is widened out so as to form a seat is pressed upon the jaws will be firmly closed and when the pressure is removed, a spring operating upon the underside of the lever will cause it to rise, and the jaws will open. This spring may be situated in the underside of the trestle, and connected with the lever by a rod extending up to it, or it may be placed between the lever and the top of the trestle, a counter weight may be also used instead of the spring but with not equal advantage.

A table or platform may be fixed at the off side of the clamp on which the work when requisite may rest; and this will at the same time serve to prevent its coming in the way of the lever.

× Drawing 102 8179X

What I claim as my invention is the manner of arranging this apparatus
for closing & opening the Jaws of the clamp by means of the seat and a spring
operating in the manner set forth, without intending hereby to limit myself
to the precise form & manner described but to vary the same in any way
which I may find convenient, whilst the general principle remains un-
changed

Witnesses
A Burrington
A M. Eggleston

Joseph Burrington

Exd
[illegible]

532 . [illegible]